(12) United States Patent
Wei et al.

(10) Patent No.: US 9,376,036 B2
(45) Date of Patent: Jun. 28, 2016

(54) DISC RECLINER WITH INTERNAL LEAF SPRINGS

(75) Inventors: Xiao J Wei, Canton, MI (US); Omar D Tame, West Bloomfield, MI (US)

(73) Assignee: Magna Seating Inc., Aurora, Ontario (CA)

( * ) Notice: Subject to any disclaimer, the term of this patent is extended or adjusted under 35 U.S.C. 154(b) by 199 days.

(21) Appl. No.: 14/127,001

(22) PCT Filed: Jun. 15, 2012

(86) PCT No.: PCT/CA2012/000595
§ 371 (c)(1),
(2), (4) Date: Dec. 17, 2013

(87) PCT Pub. No.: WO2012/174644
PCT Pub. Date: Dec. 27, 2012

(65) Prior Publication Data
US 2015/0165936 A1 Jun. 18, 2015

Related U.S. Application Data

(60) Provisional application No. 61/522,852, filed on Aug. 12, 2011, provisional application No. 61/498,751, filed on Jun. 20, 2011.

(51) Int. Cl.
*B60N 2/235* (2006.01)
(52) U.S. Cl.
CPC .............. *B60N 2/236* (2015.04); *B60N 2/2356* (2013.01)
(58) Field of Classification Search
CPC ............................... B60N 2/2356; B60N 2/236
USPC ..................................................... 297/367 P
See application file for complete search history.

(56) References Cited

U.S. PATENT DOCUMENTS

| 5,216,936 | A | 6/1993 | Baloche |
| 6,439,663 | B1 | 8/2002 | Ikegaya |
| 6,454,354 | B1 * | 9/2002 | Vossmann ............ B60N 2/2356 |
| | | | 297/367 R |
| 6,561,585 | B2 | 5/2003 | Cilliere et al. |
| 6,666,515 | B2 | 12/2003 | Asano et al. |
| 6,749,263 | B2 | 6/2004 | Peters |
| 7,360,838 | B2 | 4/2008 | Smuk |
| 7,475,945 | B2 | 1/2009 | Reubeuze et al. |

(Continued)

FOREIGN PATENT DOCUMENTS

| CA | 2673192 | 7/2008 |
| CA | 2727953 | 2/2010 |

(Continued)

*Primary Examiner* — David R Dunn
*Assistant Examiner* — Tania Abraham
(74) *Attorney, Agent, or Firm* — Miller Canfield (57) ABSTRACT

A disc recliner for a seat assembly includes a guide plate and a tooth plate rotatably coupled to the guide plate. A rotatable shaft moves a pawl between a first position engaging the tooth plate to prevent pivotal movement of the seat back and a second position disengaged with the tooth plate to allow pivotal movement of the seat back. A leaf spring extends between a first end secured to the guide plate and a second end having a convex curve portion engaging a lobe on the shaft. The spring biases the shaft in a first direction to maintain the pawl in the first position. Rotation of the shaft in a second direction moves the pawl from the first position to the second position as the lobe pushes against and rides along the convex curve portion of the spring, thereby controlling an actuation effort of the disc recliner.

10 Claims, 9 Drawing Sheets

(56) References Cited

U.S. PATENT DOCUMENTS

| | | | |
|---|---|---|---|
| 7,571,963 B2 | 8/2009 | Peters et al. | |
| 7,703,852 B2 | 4/2010 | Wahls et al. | |
| 7,722,121 B2 | 5/2010 | Fujioka et al. | |
| 8,042,872 B2 | 10/2011 | Kim et al. | |
| 2002/0000746 A1* | 1/2002 | Matsuura | B60N 2/2356 297/366 |
| 2004/0084945 A1* | 5/2004 | Toba | B60N 2/2356 297/367 R |
| 2006/0043778 A1 | 3/2006 | Volker et al. | |
| 2006/0202537 A1* | 9/2006 | Smuk | B60N 2/2356 297/366 |
| 2008/0231103 A1* | 9/2008 | Rohee | B60N 2/20 297/354.1 |
| 2009/0140565 A1* | 6/2009 | Wahls | B60N 2/2356 297/369 |
| 2009/0302658 A1 | 12/2009 | Fassbender et al. | |
| 2010/0109408 A1* | 5/2010 | Ohba | B60N 2/2356 297/367 P |
| 2010/0127546 A1* | 5/2010 | Dziedzic | B60N 2/2356 297/367 R |
| 2010/0194165 A1* | 8/2010 | Iguchi | B60N 2/2356 297/367 P |
| 2010/0231022 A1* | 9/2010 | Kim | B60N 2/2356 297/367 R |
| 2010/0319482 A1* | 12/2010 | Fassbender | B60N 2/2356 74/577 R |
| 2011/0001346 A1 | 1/2011 | Yamada et al. | |

FOREIGN PATENT DOCUMENTS

| | | |
|---|---|---|
| DE | 20023584 | 12/2004 |
| DE | 102006056004 | 8/2007 |
| EP | 0502774 | 9/1992 |
| FR | 2626154 | 7/1989 |
| JP | H02228914 | 9/1990 |
| WO | 2010101569 | 9/2010 |

* cited by examiner

DISC RECLINER WITH INTERNAL LEAF SPRINGS

RELATED APPLICATIONS

This application claims priority to and all the benefits of U.S. Provisional Application Nos. 61/498,751, filed Jun. 20, 2011 and entitled "Disc Recliner with Internal Leaf Springs" and 61/522,852, filed Aug. 12, 2011 and entitled "Disc Recliner with Long Arm Internal Leaf Springs".

BACKGROUND OF THE INVENTION

1. Field of the Invention

The present invention relates to a disc recliner for a vehicle seat assembly that allows pivotal adjustment of a seat back relative to a seat cushion. More particularly, the present invention relates to a disc recliner having internal leaf springs providing an actuation torque that remains relatively constant or decreases as the disc recliner is actuated to allow pivotal movement of a seat back relative to a seat cushion.

2. Description of Related Art

Automotive vehicles typically include one or more seat assemblies having a seat cushion and a seat back tar supporting passengers above a vehicle floor. The seat assembly is commonly mounted to the vehicle floor by a seat track assembly for providing fore and aft adjustment of the seat assembly for passenger comfort. The seat back is typically pivotally coupled to the seat cushion by a recliner assembly for providing pivotal adjustment of the seat back relative to the seat cushion.

It is common that the recliner assembly includes a pair of spaced apart disc recliners that operatively couple the seat back to the seat cushion. A typical disc recliner generally includes a fixed plate secured to the seat cushion and a movable plate secured to the seat back and rotatably coupled to the fixed plate. The disc recliner also includes a locking mechanism to secure the movable plate to the fixed plate thereby maintaining the seat back in a reclined seating position. One type of locking mechanism includes one or more pawls with each pawl having a plurality of teeth. The pawls are movable, either slidably or pivotally, in a radial direction between a locked position and an unlocked position. With the pawls in the locked position, the teeth on the pawls are engaged with an annular rim of teeth on the movable plate, thus locking the seat back relative to the seat cushion. With the pawls in the unlocked position, the teeth on the pawls are disengaged from the annular rim of teeth on the movable plate, thus allowing pivotal adjustment of the seat back relative to the seat cushion between a plurality of reclined seating positions.

The pawls are typically spring biased to the locked position through a cam that is mounted on a shaft. An actuation torque is applied to rotate the shaft and overcome the spring bias, which allows the pawls to move from the locked position to the unlocked position. However, as the shaft is rotated, the spring bias and torque increases such that the actuation force to unlock the disc recliner may become undesirable.

It is desirable, therefore, to provide a disc recliner which is spring biased to a locked condition wherein the actuation force is controlled to prevent undesirable operating efforts.

SUMMARY OF THE INVENTION

According to one aspect of the invention, a disc recliner operatively couples a seat back to a seat cushion to allow pivotal movement of the seat back between a plurality of reclined seating positions. A guide plate is adapted to be mounted to the seat cushion and a tooth plate is adapted to be mounted to the seat back and rotatably coupled to the guide plate. At least one pawl is operatively coupled to the guide plate and is movable between a first position and a second position. In the first position, the pawl engages the tooth plate, thereby interlocking the guide plate and the tooth plate together in a locked condition to prevent pivotal movement of the seat back. In the second position, the pawl is disengaged from the tooth plate, thereby unlocking the guide plate and the tooth plate in an unlocked condition to allow pivotal movement of the seat back. A shaft includes at least one lobe formed thereon. Rotation of the shaft moves the pawl between the first and second positions. A leaf spring biases the shaft in a first direction to maintain the pawl in the first position. The leaf spring extends between a first end secured to the guide plate and a second distal end having a convex curve portion. Rotation of the shaft in a second direction, opposite the first direction, moves the pawl from the first position to the second position as the lobe pushes against and rides along the convex curve portion of the spring.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
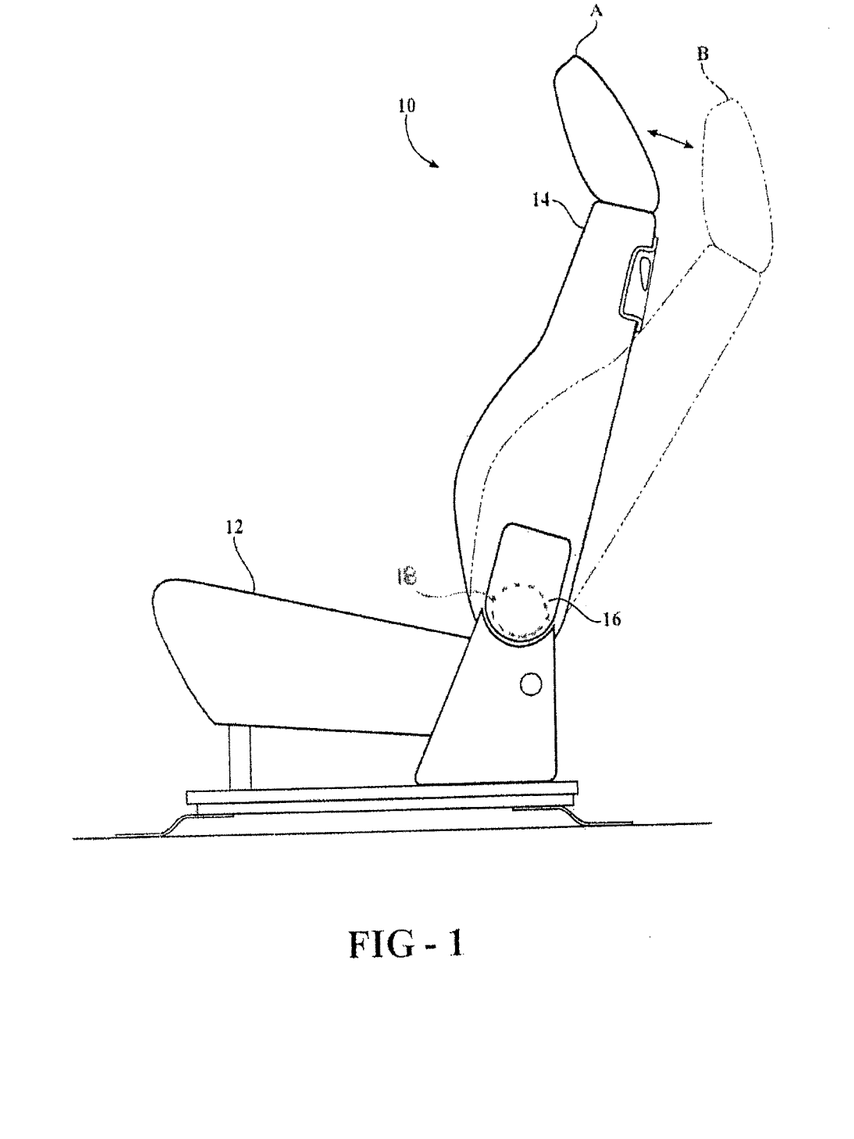
FIG. 1 is a side view of a vehicle seat assembly including a seat back operatively coupled to a seat cushion with a disc recliner.

Referring to the Figures, wherein like numerals indicate like or corresponding parts throughout the several views, a seat assembly for use in an automotive vehicle is generally shown at 10. Referring to FIG. 1, the seat assembly 10 includes a generally horizontal seat cushion 12 and a generally upright seat back 14 operatively and pivotally coupled by a recliner assembly 16 to the seat cushion 12. The recliner assembly 16 includes a pair of spaced apart and synchronized disc recliners 18 (one shown).

Referring to FIGS. 2 through 6, the disc recliners 18 are operable between a locked condition, preventing pivotal movement of the seat back 14 relative to the seat cushion 12, and an unlocked condition, allowing pivotal adjustment of the seat back 14 relative to the seat cushion 12 about a laterally extending axis 20 between an upright seating position A and a plurality of reclined seating positions, one of which is shown at B. Only one of the disc recliners 18 will be described in detail. The disc recliner 18 generally includes a fixed guide plate 22 that is adapted to be mounted to the seat cushion 12 and a movable tooth plate 24 that is adapted to be mounted to the seat back 14, as is commonly known in the art. The guide plate 22 and the tooth plate 24 are held together by a retaining ring 26 in a manner well known in the art such that the tooth plate 24 can rotate about the pivot axis 20 relative to the guide plate 22. It is understood that rotation of the tooth plate 24 relative to the guide plate 22 causes pivotal movement of the seat back 14 relative to the seat cushion 12.

Figure 2:
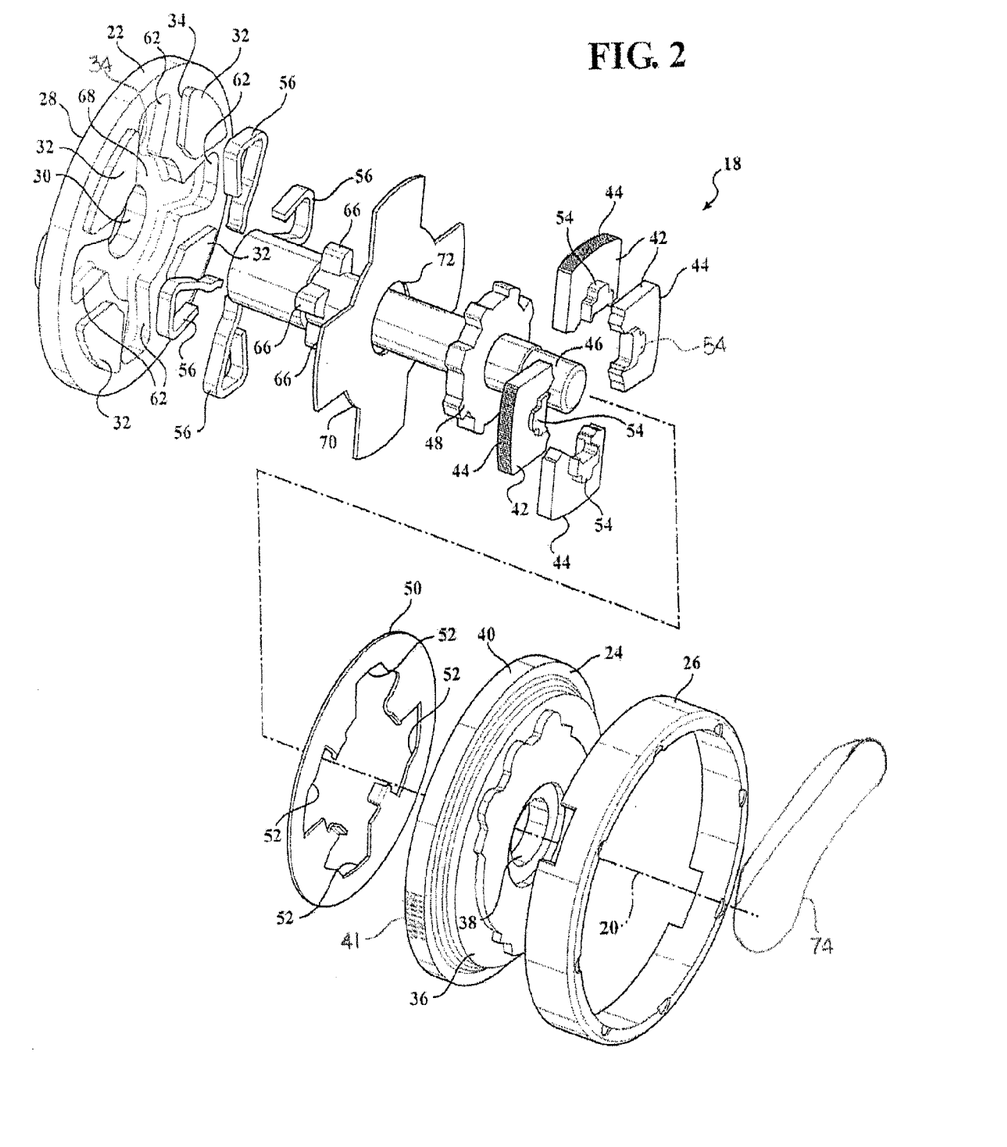
FIG. 2 is an exploded view of the disc recliner according to one embodiment of the invention.
Figure 3:
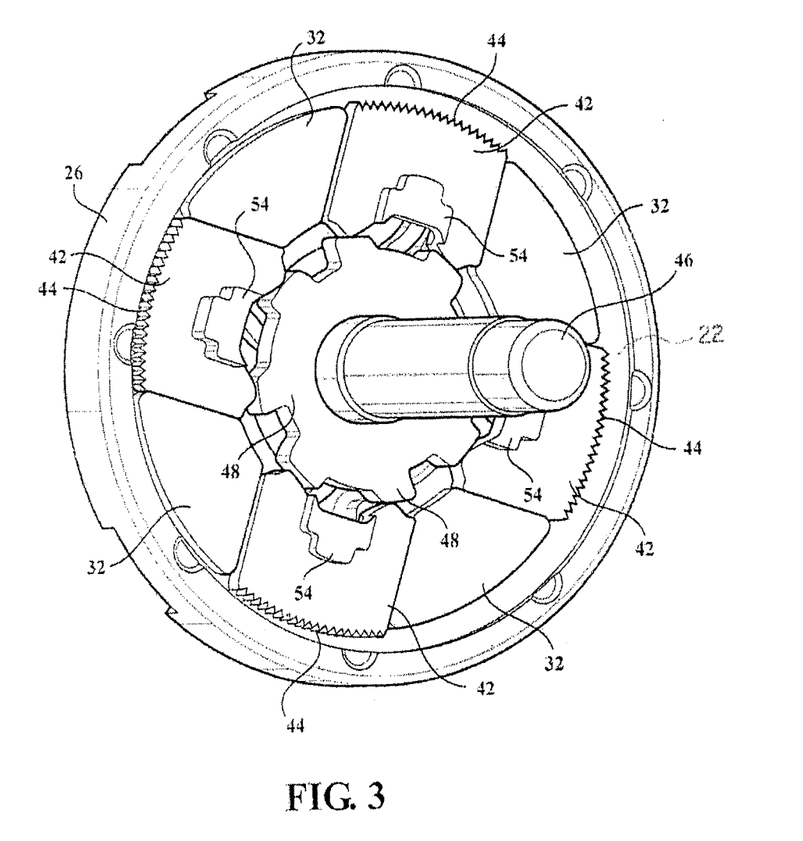
FIG. 3 is a perspective view of the disc recliner of FIG. 2 with a movable tooth plate and control plate removed to illustrate a cam urging a set of pawls into a first position.

The guide plate 22 is circular and includes an end wall 28 having a first central bore 30 extending axially therethrough. The first central bore 30 is coaxial with the pivot axis 20. An outer side of the end wall 28 is adapted to be fixedly secured to the seat cushion 12 by any suitable means. An inner side of the guide plate 22 includes a series of embossments 32 that define generally parallel and opposing guide surfaces 34.

The tooth plate 24 is circular, generally cup-shaped, and includes an end wall 36 having a second central bore 38 extending axially therethrough. The second central bore 38 is coaxial with the pivot axis 20. An outer side of the end wall 36 is adapted to be fixedly secured to the seat back 14 by any suitable means. A side wall 40 extends axially from the end wall 36 and circumferentially around the tooth plate 24. A plurality of radially extending teeth 41 is disposed around the inside of the side wall 40.

A set of pawls 42 are guided by and between opposing guide surfaces 34 of the embossments 32 on the guide plate 22 and move radially inward and outward to actuate the disc recliner 18 between the locked and unlocked conditions. In the embodiment shown, there are four pawls 42 and each pawl 42 includes an outer edge having a plurality of radially extending teeth 44 adapted for meshing engagement with the teeth 41 on the tooth plate 24. In the locked condition, the pawls 42 are disposed in a first position such that the teeth 44 on the pawls 42 are in meshing engagement with the teeth 41 on the tooth plate 24 to prevent rotation of the tooth plate 24 relative to the guide plate 22. In an unlocked condition, the pawls 42 are disposed in a second position such that the teeth 44 on the pawls 42 are disengaged from the teeth 41 on the tooth plate 24 to allow rotation of the tooth plate 24 relative to the guide plate 22.

Figure 4:
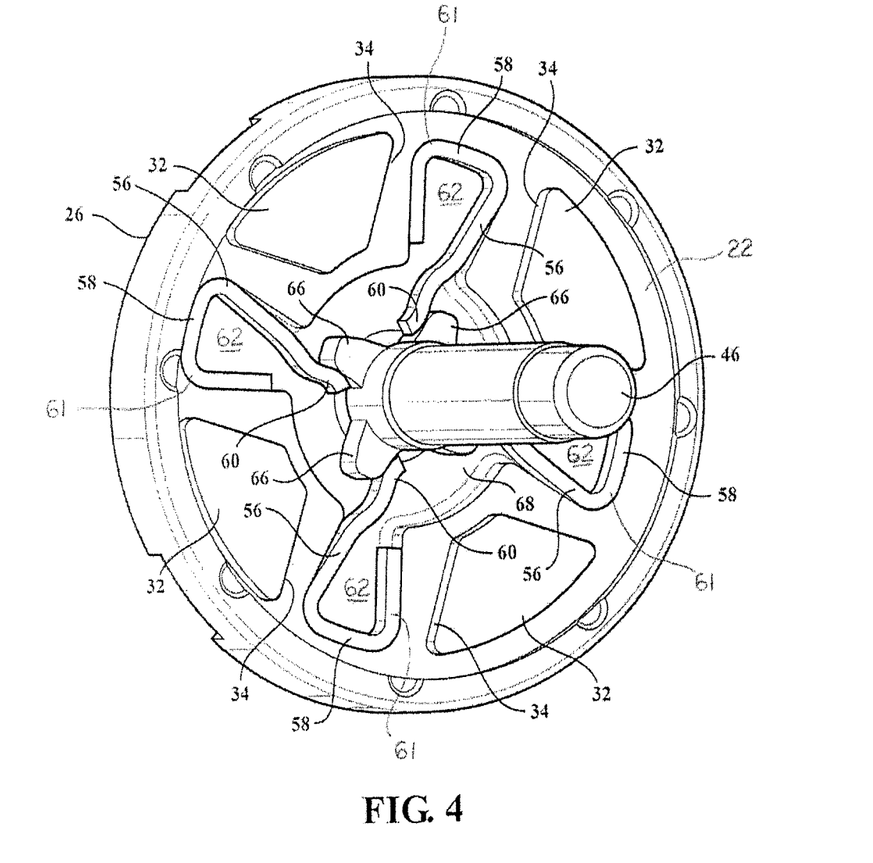
FIG. 4 is a perspective view of the disc recliner of FIG. 2 with the movable tooth plate, control plate, and cam removed to illustrate four leaf springs engaging lobes on a shaft.
Figure 5:
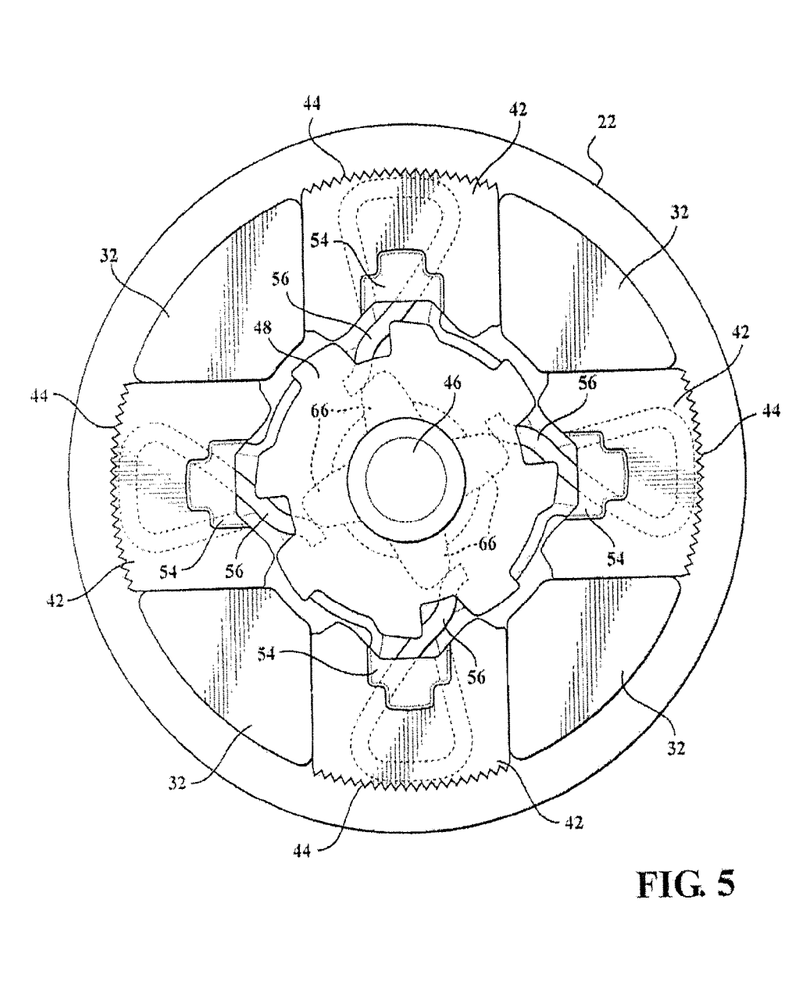
FIG. 5 is a side view of the disc recliner of FIG. 2 with the movable tooth plate and control plate removed to illustrate the cam in a rotated position and the set of pawls in a second position.
Figure 6:
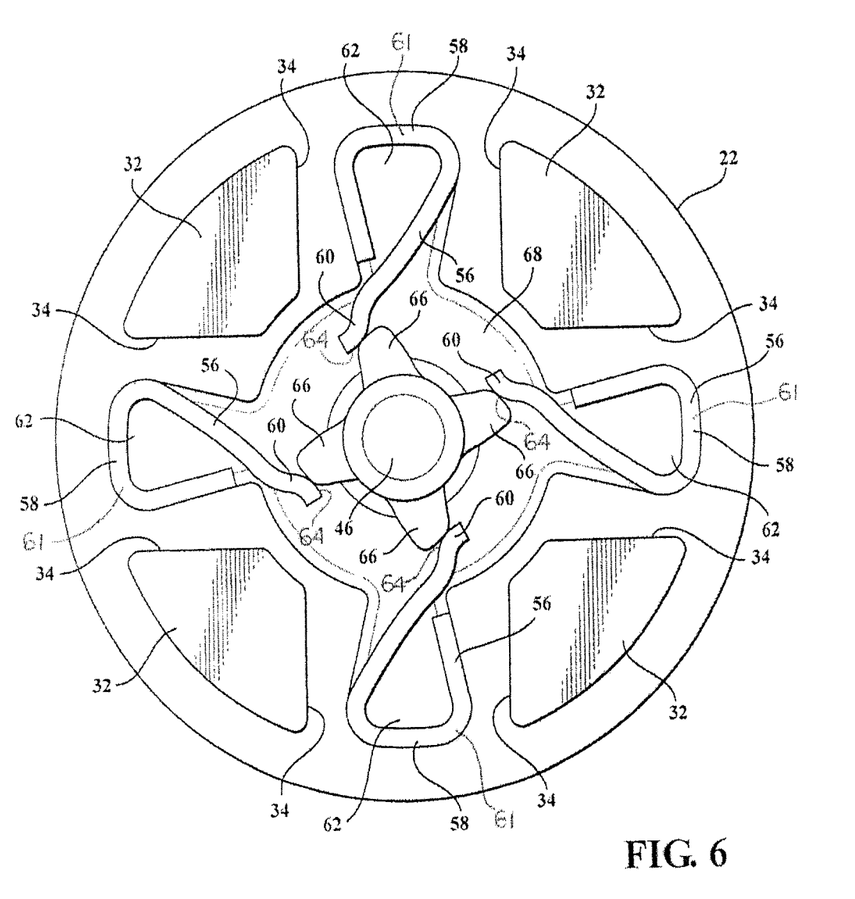
FIG. 6 is a side view of the disc recliner of FIG. 2 with the movable tooth plate, control plate, and cam removed to illustrate a convex curve portion of the leaf springs engaging the lobes.

The pawls 42 move radially inward and outward between the first and second positions in response to rotation of a shaft 46. The shaft 46 extends axially through the first central bore 30 in the guide plate 22 and the second central bore 38 in the tooth plate 24. A cam 48 is fixedly mounted on the shaft 46 for rotation therewith and is adapted for engagement with an inner edge of the pawls 42. The shaft 46 is spring biased in a first direction (clockwise when viewed from the Figures) such that the cam 48 normally urges the pawls 42 radially outward to the first position, as shown in Figured 3 and 4, such that the outwardly-facing teeth 44 on the pawls 42 are in meshing engagement with the inwardly-facing teeth 41 on the tooth plate 24 to prevent rotation of the tooth plate 24 relative to the guide plate 22. Rotation of the shaft 46 in the opposite second direction rotates the cam 48 in the second direction, thereby moving the pawls 42 radially inward to the second position, as shown in FIGS. 5 and 6, such that the outwardly facing teeth 44 on the pawls 42 are disengaged from the inwardly-facing teeth 41 on the tooth plate 24 to allow rotation of the tooth plate 24 relative to the guide plate 22. A control plate 50 is disposed adjacent the pawls 42 and is operatively coupled to the cam 48 for rotation therewith. The control plate 50 is adapted for moving the pawls 42 radially inward to the second position in response to rotation of the shaft 46 in the second direction. More specifically, the control plate 50 includes an inner profile 52 that engages tabs 54 on the pawls 42 to move the pawls 42 radially inward in response to rotation of the shaft 46 in a second direction (counterclockwise when viewed in the Figures). The inner profile 52 allows the cam 48 to move the pawls 42 radially outward to the first position in response to rotation of the shaft 46 in the first direction. Alternatively, the pawls 42 could be moved radially inward directly by the cam 48 in a manner well known in the art. This negates the need for a separate control plate 50. An example of such an arrangement is shown in U.S. Pat. No. 7,766,428.

In the embodiment shown, the shaft 46 is biased in the first direction by four leaf springs 56 operatively coupled between the guide plate 22 and the shaft 46. Each spring 56 includes a first end 58 and a second end 60. The first end 58 of each spring 56 includes a triangular-shaped loop 61 that is captured in a complementary triangular-shaped pocket 62 formed in the guide plate 22 between adjacent embossments 32. The second end 60 of each spring 56 includes an arcuate profile defining a convex curve portion 64 adapted for engagement with a lobe 66 on the shaft 46. More specifically, there are four lobes 66 disposed circumferentially around the shaft 46 and the convex curve portion 64 of each spring 56 engages one of the lobes 66 to bias the shaft 46 in the first direction. It is appreciated that more or less than four springs 56 may be used without varying from the scope of the invention.

The center of the guide plate 22 includes a recessed portion 68 surrounding the first central bore 30 designed to receive the lobes 66 on the shaft 46. A cover plate 70 is disposed laterally between the guide plate 22 and the pawls 42 covering the recessed portion 68, springs 56 and lobes 66 to provide a smooth surface for the pawls 42 to slide against as the pawls 42 move between the first and second positions. The cover plate 70 also prevents the pawls 42 from hanging-up on the springs 56 in the pockets 62. The cover plate 70 is generally cross-shaped, or generally complementary to the shape formed by the recessed portion 68 and pockets 62, and extends between adjacent embossments 32 on the guide plate 22. The cover plate 70 includes a third central bore 72 for receiving the shaft 46 axially therethrough.

A recliner handle or knob 74 is mounted to an end of the shaft 46 to operate the disc recliner 18. The operating efforts at the recliner handle 74 during actuation of the disc recliner 18 from the locked condition to the unlocked condition are a result of the bias of the springs 56 that must be overcome. Actuating the recliner handle 74 causes the shaft 46 to rotate in the second direction which also rotates the cam 48 and control plate 50 in the second direction, thereby moving the pawls 42 radially inward to the second position such that the teeth 44 on the pawls 42 are disengaged with the teeth 41 on the tooth plate 24 to allow rotation of the tooth plate 24 relative to the guide plate 22. As the shaft 46 rotates in the second direction, the lobes 66 initially push against the convex curve portion 64 of the springs 56 and then ride longitudinally along the length of the convex curve portion 64. As the lobes 66 push against the convex curve portion 64 of the springs 56 the recliner handle operating effort remains relatively constant and then decreases as the lobes 66 ride along the convex curve portion 64. Thus, the interaction between the lobes 66 and the convex curve portion 64 of the springs 56 prevent a linear increase in the recliner handle operating effort that would otherwise occur when coil springs are used as is typical in the art.

Figure 7:
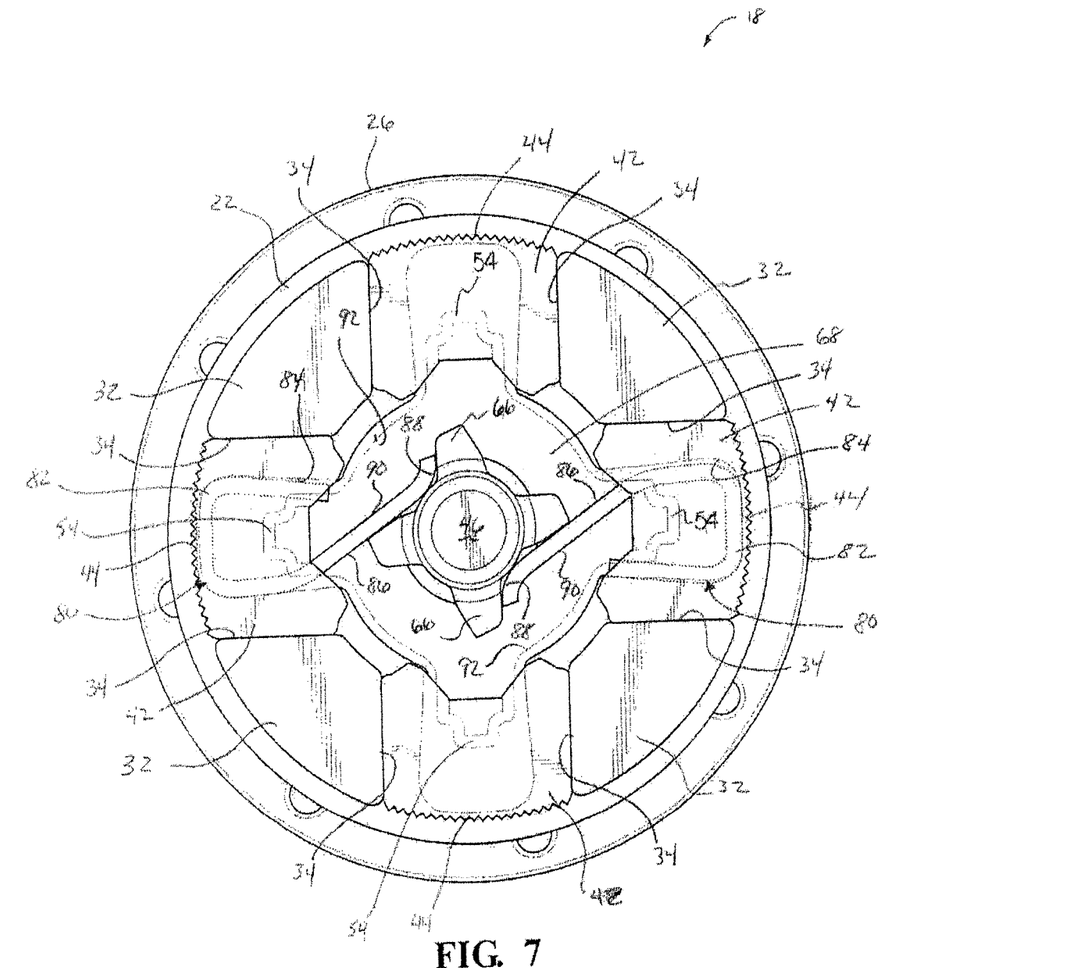
FIG. 7 is a side view of the disc recliner according to an alternative embodiment of the invention.
Figure 8:
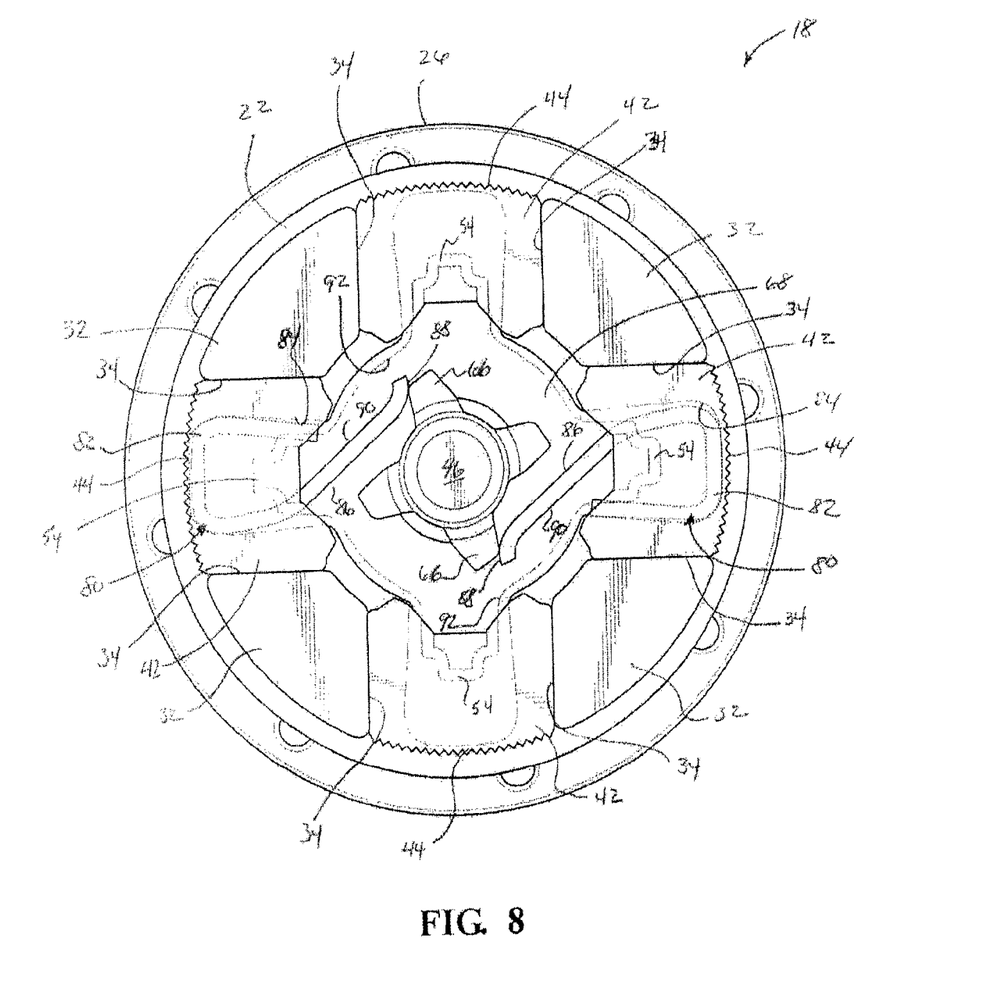
FIG. 8 is a side view of the disc recliner of FIG. 7 in a locked condition.
Figure 9:
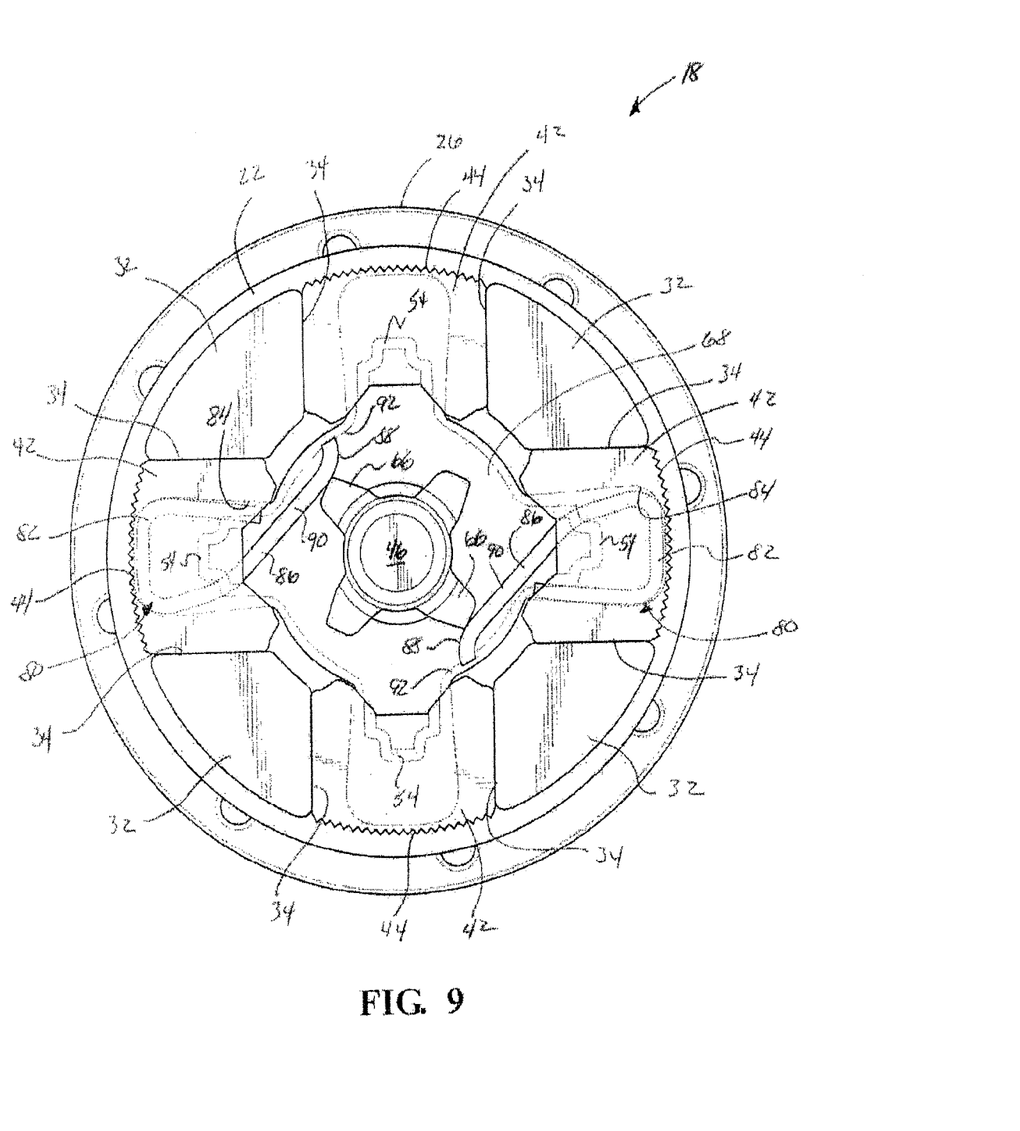
FIG. 9 is a side view of the disc recliner of FIG. 7 in an unlocked condition.

Referring to FIGS. 7-9, an alternative embodiment is shown wherein like reference numbers represent corresponding parts through the various view. In the alternative embodiment shown, the shaft 46 is biased in the first direction by two leaf springs 80 operatively coupled between the guide plate 22 and the shaft 46. The springs 80 are disposed on opposite sides of the shaft 46. Each spring 80 includes a squared-off loop 82 that is captured in a square-off or substantially complementary shaped recessed pocket 84 formed in the inner side of the guide plate 22 between adjacent embossments 32. Each spring 80 also includes an elongated arm 86 extending from one side of the squared-off loop 82 to a distal end having an arcuate segment forming a convex curve portion 88 that curves away from the shaft 46. The elongated arm 86 includes a generally straight segment 90 extending between the squared-off loop 82 and the convex curve portion 88.

The shaft 46 includes four lobes 66 that are disposed around the circumference of the shaft 46 and are adapted for engaging with the springs 80. In FIG. 7, the disc recliner is shown in a partially assembled free state. More specifically, the shaft 46 is oriented such that each spring 80 can be positioned with the squared-off loop 82 in the respective pocket 84 in the guide plate 22 without the lobes 66 interfering with the elongated arm 86. It is appreciated that with the shaft 46 oriented in the position shown, the springs 80 do not bias the shaft 46 in either the first or second direction. Once the springs 80 are positioned in the guide plate 22, the shaft 46 is rotated in the second direction to the position shown in FIG. 8 and the cam 48 is then installed on the shaft 46 to maintain the pawls 42 in the first position. In FIG. 8, the disc recliner 18 is shown in the locked condition and the convex curve portion 88 at the distal end of each spring 80 engages one of the lobes 66. Thus, the springs 80 bias the shaft 46 in the first direction. It is appreciated that more or less than two springs 80 and four lobes 66 may be used without varying from the scope of the invention.

The inner side of the guide plate 22 includes a recessed portion 68 designed to receive the elongated arm 86 of the springs 80 and the lobes 66 on the shaft 46. A cover plate 70 may be disposed laterally between the guide plate 22 and the pawls 42 to cover the recessed portion 68 and springs 80 and provide a smooth surface for the pawls 42 to slide against as the pawls 42 move between the first and second positions. It is appreciated that the cover plate 70 will prevent the pawls 42 from hanging-up on the springs 80. It is contemplated that the cover plate 70 will be generally cross-shaped, or complementary in shape to the recessed portion 68 and pockets 84, in order to extend between adjacent embossments 32 on the guide plate 22.

A recliner handle or knob 74 is mounted to an end of the shaft 46 to rotate the shaft 46 in the second direction to actuate the disc recliner 18 from the locked condition to the unlocked condition. The operating efforts at the recliner handle 74 during actuation of the disc recliner 18 from the locked condition to the unlocked condition are a result of the biasing force of the springs 80 that must be overcome. As the shaft 46 is rotated in the second direction, the pawls 42 move to the second position, and allow rotation of the tooth plate 24 relative to the guide plate 22. At the same time, the lobes 66 initially ride along the convex curve portion 88 of the springs 80 causing the elongated arm 86 to deflect a first predetermined amount. The lobes 66 then ride along the straight segment 90 of the springs 80 causing the elongated arm 86 to deflect a second predetermined amount, as shown in FIG. 9. As the lobes 66 initially ride along the convex curve portion 88 and defect the elongated arm 86 the first amount, the recliner handle operating effort remains relatively constant, although it is appreciated that there may be a slight increase in the recliner handle operating effort. Once the lobes 66 reach the straight segment 90, the recliner handle operating effort decreases as the elongated arm 86 is deflected the second predetermined amount. Thus, the design of the springs 80 prevents a linear increase in the recliner handle operating effort that would otherwise occur when coil springs are used, as is typical in the art.

Referring to FIG. 9, the distal end of the springs 80 contacts a wall 92 in the recessed portion 68 of the guide plate 22 when the shaft 46 is rotated and the disc recliner is in the unlocked condition. This contact between the distal end of the springs 80 and the wall 92 prevents the springs 80 from being overstressed or deformed, which would adversely affect the performance of the disc recliner 18.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A disc recliner operatively coupling a seat back to a seat cushion for providing selective pivotal movement of the seat back between a plurality of reclined seating positions, said disc recliner comprising:
   a guide plate adapted to be mounted to one of the seat back and seat cushion;
   a tooth plate adapted to be mounted to the other of the seat back and seat cushion, wherein said tooth plate is rotatably coupled to said guide plate;
   at least one pawl operatively coupled to said guide plate and movable between a first position engaging said tooth plate, thereby interlocking said guide plate and said tooth plate in a locked condition to prevent pivotal movement of the seat back, and a second position disengaged from said tooth plate, thereby unlocking said guide plate and said tooth plate in an unlocked condition to allow pivotal movement of the seat back;
   a shaft including at least one lobe formed thereon, wherein rotation of said shaft moves said at least one pawl between said first and second positions; and
   a leaf spring biasing said shaft in a first direction to maintain said at least one pawl in said first position, said leaf spring extending between a first end secured to said guide plate and a second distal end having a convex curve portion, wherein rotation of said shaft in a second direction, opposite said first direction, moves said at least one pawl from said first position to said second position as said lobe pushes against and rides along said convex curve portion of said spring, thereby controlling an actuation effort of said disc recliner;
   wherein said guide plate includes an inner side surface having at least one recess pocket formed therein for receiving said leaf spring, said recess pocket including opposite spaced apart side walls, and wherein said leaf spring includes a loop portion defining said first end seated within said recessed pocket between said side walls and said loop portion having a shape generally complementary to the shape of said recessed pocket for engaging at least one of said side walls to prevent rotational movement of said leaf spring within said recess pocket.

2. The disc recliner as set forth in claim 1 wherein said leaf spring includes an elongated arm extending between said loop portion and said convex curve portion for biasing said shaft in said first direction to maintain said pawl in said first position.

3. The disc recliner as set forth in claim 2 wherein said guide plate includes a recessed portion formed in the inner side thereof and extending from said recessed pocket for receiving said elongated arm and convex curve portion of said leaf spring.

4. The disc recliner as set forth in claim 3 wherein said guide plate includes at least a pair of opposing leaf springs seated in a recessed pocket in said guide plate and engaged with a respective one of a pair of opposing lobes projecting from said shaft.

5. The disc recliner as set forth in claim 4 wherein said guide plate includes a plurality of embossments projecting outwardly from said inner side thereof and spaced alternately between said recessed pockets, wherein each of said embossments includes opposite side guide surfaces for guiding said at least one pawl between said first and second positions.

6. The disc recliner as set forth in claim 5 further including a cam fixedly secured to said shaft for engaging and actuating said at least one pawl between said first and second positions in response to rotation of said shaft in said first and second directions.

7. The disc recliner as set forth in claim 6 further including a cover plate positioned between said guide plate and said at least one pawl covering said recessed pocket and recessed portion of said guide plate.

8. The disc recliner as set forth in claim 7 wherein said leaf spring includes a triangular shaped loop portion received in a complementary triangularly shaped recessed pocket in said guide plate.

9. The disc recliner as set forth in claim 7 wherein said leaf spring includes a square shaped loop portion received in a complementary square shaped recessed pocket in said guide plate.

10. The disc recliner as set forth in claim 7 wherein said leaf spring includes a straight segment defining said elongated arm extending between said loop portion and said convex curve portion and wherein said second distal end of said leaf spring contacts an outer peripheral wall formed by said recessed portion in said guide plate upon full rotation of said shaft in said second direction to prevent deformation of said leaf spring.

\* \* \* \* \*